United States Patent [19]

Massie

[11] Patent Number: 5,428,524
[45] Date of Patent: Jun. 27, 1995

[54] METHOD AND APPARATUS FOR CURRENT SHARING AMONG MULTIPLE POWER SUPPLIES

[75] Inventor: Harold L. Massie, Linn, Oreg.

[73] Assignee: Intel Corporation, Santa Clara, Calif.

[21] Appl. No.: 184,388

[22] Filed: Jan. 21, 1994

[51] Int. Cl.$^6$ .............................................. H02J 1/10
[52] U.S. Cl. ........................................ 363/79; 307/44; 307/53; 307/1; 363/65
[58] Field of Search .............. 307/43, 44, 53, 51, 307/52, 60, 65; 323/234, 269; 363/65, 78, 79

[56] References Cited

U.S. PATENT DOCUMENTS

| | | | |
|---|---|---|---|
| 4,356,403 | 10/1982 | Mohat | 307/60 |
| 4,678,779 | 10/1986 | Wiscombe | 307/44 |
| 4,717,833 | 1/1988 | Small | 307/44 |
| 4,748,340 | 5/1988 | Schmidt | 307/53 |
| 4,866,295 | 9/1989 | Leventis et al. | 307/43 |
| 5,157,269 | 10/1992 | Jordan et al. | 307/59 |
| 5,164,890 | 11/1992 | Nakagawa et al. | 363/65 |
| 5,200,692 | 4/1993 | Krinsky et al. | 323/269 |
| 5,200,693 | 4/1993 | Brown | 307/53 |

*Primary Examiner*—Thomas M. Dougherty
*Assistant Examiner*—Shawn Riley
*Attorney, Agent, or Firm*—Blakely, Sokoloff, Taylor & Zafman

[57] ABSTRACT

An apparatus and method for current sharing among multiple power supplies is disclosed. The output current of each power supply is compared in an amplifier which produces an output signal. This signal controls a transistor used to enable or disable current flow on a SENSE line in a particular power supply. By controlling the SENSE line, the output current of each power supply is adjusted to roughly equal levels. The combined current is thereby the combination of approximately equal shared outputs of each individual power supply. The current share of each individual power supply is offset by a predetermined level to prevent a race condition in the initial power-up phase.

3 Claims, 4 Drawing Sheets

METHOD AND APPARATUS FOR CURRENT SHARING AMONG MULTIPLE POWER SUPPLIES

BACKGROUND OF THE INVENTION

1. Field of the Invention

The present invention relates to power supplies. Specifically, the present invention relates to the current sharing and redundancy among multiple power supplies.

2. Description of Related Art

In many situations, it is advantageous to combine two or more smaller power supplies together for driving a load instead of providing a single higher powered power supply. In some cases, two smaller power supplies may be less expensive than a single larger power supply. In other situations, it is advantageous to distribute power among several power supplies rather than centralize power in a single power supply. In some electronics enclosures, there may not be enough physical space to accommodate a larger power supply.

Several problems are encountered when multiple power supplies are combined to drive a single load. First, it is important that the load be shared approximately equally between each power supply. Roughly equal load sharing assures that one power supply is not over-driven as a result of the inability of another power supply to equally share the load. Some prior art systems provide multiple power supplies for redundancy purposes. In these systems, however, the load is not typically shared among each power supply. Instead, the load is primarily driven by one power supply or alternatively a redundant power supply. These prior art systems do not provide current sharing among multiple low-cost and off-the-shelf power supplies.

Another problem in a multiple power supply configuration is the need for a circuit to limit the current drawn from a particular power supply. Because a load in a typical electronics system may require more power than a single smaller power supply may provide, a circuit is needed to limit the current provided by any one particular power supply in a set of shared power supplies.

Thus, a better method and apparatus for current sharing among multiple power supplies is needed.

SUMMARY OF THE INVENTION

The present invention is an apparatus and method for current sharing among multiple power supplies. A current sharing multiple power supply comprises: 1) a first power supply having a first output line and a first control line, 2) a second power supply having a second output line and a second control line, and 3) a current sharing circuit having, a) a first circuit for comparing an output current on the first output line with an output current on the second output line, the first circuit being coupled to the first output line and the second output line, b) a second circuit coupled to the first circuit and the second control line for applying a current on the second control line if the output current on the first output line is greater than the output current on the second output line, the output current on the second output line increasing in response to the current applied on the second control line, and c) a third circuit coupled to the first circuit and the first control line for applying a current on the first control line if the output current on the first output line is less than the output current on the second output line, the output current on the first output line increasing in response to the current applied on the first control line.

It is therefore an advantage of the present invention to provide an apparatus and method for current sharing among multiple power supplies. It is a further advantage of the present invention to provide a current limiting circuit for a multiple power supply configuration. It is a further advantage of the present invention to provide a circuit for current sharing and current limiting that operates using standard pin-outs provided by conventional power supplies. It is a further advantage of the present invention to provide a current sharing circuit that provides a means for preventing a current sharing race condition. It is a further advantage of the present invention to provide a means for using two smaller and lower cost power supplies in place of a single more expensive higher power, power supply. It is a further advantage of the present invention to provide a means for forcing multiple power supplies to share the current load almost equally. It is a further advantage of the present invention that the current sharing circuit allows the output voltage of the combined power supply to be set at a tighter tolerance using a predetermined voltage reference.

These and other advantages of the present invention are fully described in the following detailed description of the preferred embodiment.

DETAILED DESCRIPTION OF THE PREFERRED EMBODIMENT

The present invention is an apparatus and method for current sharing among multiple power supplies. In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and circuits have not been shown in detail to avoid unnecessarily obscuring the present invention.

Figure 1:
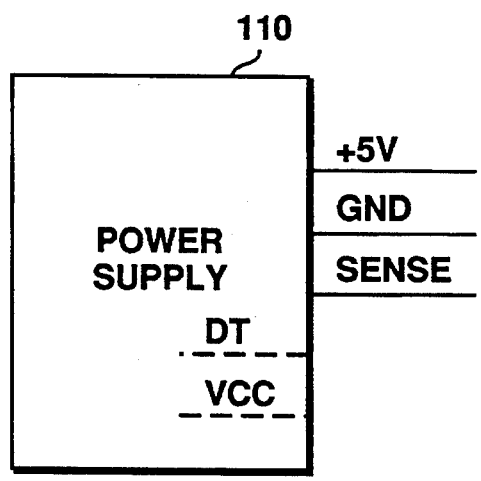
FIG. 1 illustrates the pin-out for a standard prior art power supply.

Referring now to FIG. 1, a pin-out of a standard prior art power supply is illustrated. A prior art power supply such as the one illustrated in FIG. 1, provides a set of well-known pin-outs for coupling the power supply to an electronic system. Power supplies of this type are available from Delta Electronics of Taiwan, for example, with various power capacities, including 10–500 watts. Referring to FIG. 1, these prior art power supplies include a +5 Volt output, a Ground (GND) line, and a SENSE line (control line). A DEAD TIME (DT) line and a $V_{CC}$ line is provided internally. The +5 Volt line provides a standard voltage source for transistor/transistor Logic (TTL) devices in a standard electronics system. The Ground (GND) line provides a common ground for the system. The SENSE line is used to sense the voltage at the load. This SENSE line assures that the power supply maintains output voltages at the load within a predetermined tolerance. In typical prior art systems, the SENSE line is tied to the +5 volt line at the load. The internal DEAD TIME (DT) line provides a means for shutting off the power supply in a fault condition, such as an over-voltage or over-current condition. If the DT signal is asserted, the power supply inhibits providing voltages on its output pins. The internal $V_{CC}$ line is a standard system wide power source connection.

Figure 2:
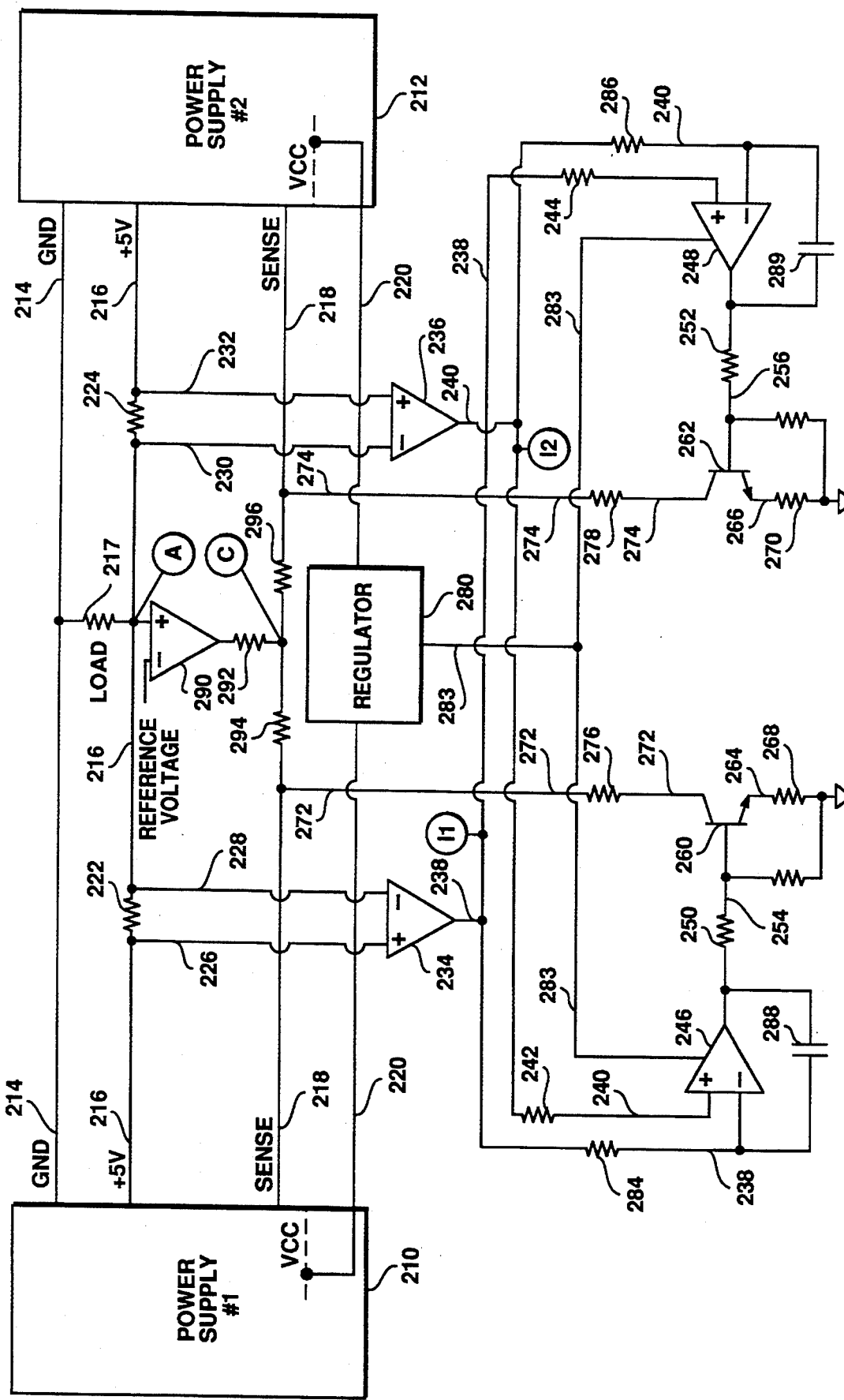
FIG. 2 is a schematic illustrating the current sharing circuit of the present invention.

Referring now to FIG. 2, the current sharing circuit of one embodiment of the present invention is illustrated. FIG. 2 illustrates a first power supply 210 and a second power supply 212. These power supplies are well known in the art and similar to the power supply illustrated in FIG. 1. The present invention allows these two low cost power supplies to be used together in place of a single more expensive and higher-powered supply. The current sharing circuit illustrated in FIG. 2 is used to force power supply 210 and power supply 212 to share the current load almost equally. Either power supply may act as a master supply. The power supply with the highest output voltage becomes the master. The master power supply current will always be greater than that of the other power supply by a fixed offset current. The fixed offset current is set by offset resistors as will be discussed below. The combined output voltage of power supply 210 and power supply 212 is set to a tight tolerance using a simple three terminal voltage reference as will also be described below.

Referring now to FIG. 2, the Ground line 214 of power supply 210 is coupled with the Ground line of power supply 212. Similarly, the five volt output 216 of power supply 210 is coupled to the five volt output of power supply 212 through resistors 222 and 224. Resistor 217 represents the system load which is being driven by the combined outputs of power supply 210 and power supply 212. It is the current delivered to this load that the present invention balances between power supply 210 and power supply 212. The current output of power supply 210 is measured across resistor 222 using lines 226 and 228. These lines are input to an amplifier 234. The output 238 of amplifier 234 represents a current I1 being outputted by power supply 210. In a similar manner, the current of power supply 212 is measured across resistor 224 using lines 230 and 232. These lines are input to amplifier 236. The output 240 of amplifier 236 represents the current I2 being produced by power supply 212.

The $V_{CC}$ line 220 of power supply 210 is essentially ORed together with the $V_{CC}$ line 220 of power supply 212 through regulator 280. The circuit of regulator 280 is well known to those of ordinary skill in the art. Regulator 280 combines the voltage on the $V_{CC}$ lines of both power supplies and produces a regulated voltage of approximately 12 volts on line 283. This regulated $V_{CC}$ voltage is coupled to the amplifiers 246 and 248 in order to provide power for these devices.

The output 238 of amplifier 234 (i.e. current I1) is tied to the negative input of amplifier 246 through offset resistor 284. Similarly, the output 240 of amplifier 236 (i.e. current I2) is tied to the negative input of amplifier 248 through offset resistor 286. The current I1 on line 238 is coupled to the positive input of amplifier 248 through resistor 244. Similarly, the current I2 on line 240 is coupled to the positive input of amplifier 246 through resistor 242. Amplifiers 246 and 248 compare the current outputs of each power supply with the output produced by the other power supply. The output of amplifier 246 drives the base of transistor 260 through resistor 250. The collector of transistor 260 is coupled to SENSE line 218 of power supply 210 through resistor 276. The emitter of transistor 260 is coupled to ground through resistor 268. The output of amplifier 248 drives the base input of transistor 262 through resistor 252. The collector of transistor 262 is coupled to SENSE line 218 of power supply 212 through resistor 278. The emitter of transistor 262 is coupled to ground through resistor 270. Transistor 260 is used to selectively increase the current pulled through SENSE line 218 thereby increasing the current output of power supply 210. Similarly, transistor 262 is used to selectively increase the current pulled through SENSE line 218 thereby increasing the current output of power supply 212. The current pulled through line 272 and transistor 260 causes a voltage drop across SENSE resistor 294 in the SENSE line 218 of power supply 210. This voltage drop causes power supply 210 to increase its output voltage. In one implementation, this output voltage increase is limited to no more than 10%. The current pulled through line 274 and transistor 262 causes a voltage drop across SENSE resistor 296. This voltage drop causes power supply 212 to increase its output voltage. Again, this output voltage change in limited to an increase of no more than 10%.

As an example of the operation of the current sharing circuit of the present invention, suppose the current I 1 of power supply 210 is less than the current output I2 of power supply 212. Because I2 is greater than I1, the positive input of amplifier 246 will be greater than the negative input of amplifier 246. Because amplifier 246 is a non-inverting amplifier, a positive voltage will appear at the base of transistor 260. As a result, current flow will begin through line 272 and resistor 294, which will cause a voltage drop on SENSE line 218. The voltage drop on SENSE line 218 will cause power supply 210 to increase its output voltage. This increase in the output voltage of power supply 210 will continue as long as the current output I2 of power supply 212, is greater than the current output I1 of power supply 210. In a similar manner, if the current output I1 of power supply 210 is greater than the current output I2 of power supply 212, the positive input to amplifier 248 will be greater than the negative input of amplifier 248. In this case, the output of amplifier 248 will turn on transistor 262 and cause current flow to begin through line 274 and resistor 296, which will cause a voltage drop on SENSE line 218. The voltage drop on SENSE line 218 will cause power supply 212 to increase its output voltage. This increase in the output voltage of power supply 212 will continue as long as current I1 is greater than current I2.

In order to prevent the circuitry of the present invention from allowing the current output of each power supply to uncontrollably increase in a race condition, the present invention includes offset resistors 284 and 286 in lines 238 and 240, respectively, which feed the negative inputs to amplifiers 246 and 248. An offset current created by these offset resistors ensures that the output of amplifiers 246 and 248 are both disabled until the output current (I1 or I2) exceeds the offset current. This offset current would normally be set to 1-5% of the maximum combined output current of both power supplies together. This offset current allows the power supply with the highest output voltage setpoint to be the master. The amplifier 246 or 248 with the highest positive input will amplify the current difference and force the corresponding power supply to increase its output voltage until its current is equal to the higher voltage power supply less the offset current. In this manner, the master power supply will always be within a predetermined offset current of the slave power supply. The amplifier 246 or 248 with the lower positive input voltage will be off. The offset current assures that only one amplifier will be on at a time.

Still referring to FIG. 2, the output voltage of the combined power supplies may be set to a tight tolerance using amplifier 290. The positive input of amplifier 290 is coupled to the combined five volt output of power supplies 210 and 212. Reference point A identifies a point where the combined outputs of power supplies 210 and 212 are available to the rest of a system with which the combined power supplies are used. This combined system voltage is compared with a reference voltage coupled to the negative input of amplifier 290. The output of amplifier 290 is coupled to SENSE line 218 at point C through resistor 292. Point C on SENSE line 218 represents a point at which the effect of amplifier 290 is equally shared between power supply 210 and power supply 212. Amplifier 290 compares the reference voltage on its negative input with the system voltage provided at its positive input. If the system voltage at point A is greater than the reference voltage, the output of amplifier 290 creates a more positive voltage at point C. As a result, both power supplies 210 and 21 2 decrease their output current until the system voltage at point A becomes approximately equal to the reference voltage input to amplifier 290. Similarly, if the system voltage at point A is less than the reference voltage, the output of amplifier 290 applies a less positive voltage to point C. In this case, both power supplies 210 and 212 increase their output current until the system voltage at point A is approximately equal to the reference voltage. In this manner, the output voltage of the combined power supplies is set to a tight tolerance as defined by the input reference voltage to amplifier 290. Resistor 292 limits a setpoint adjust range of amplifier 290. If amplifier 290 is removed and point C is coupled to point A, the output voltage is set by the master power supply, which is the power supply with the higher output voltage.

Figure 3:
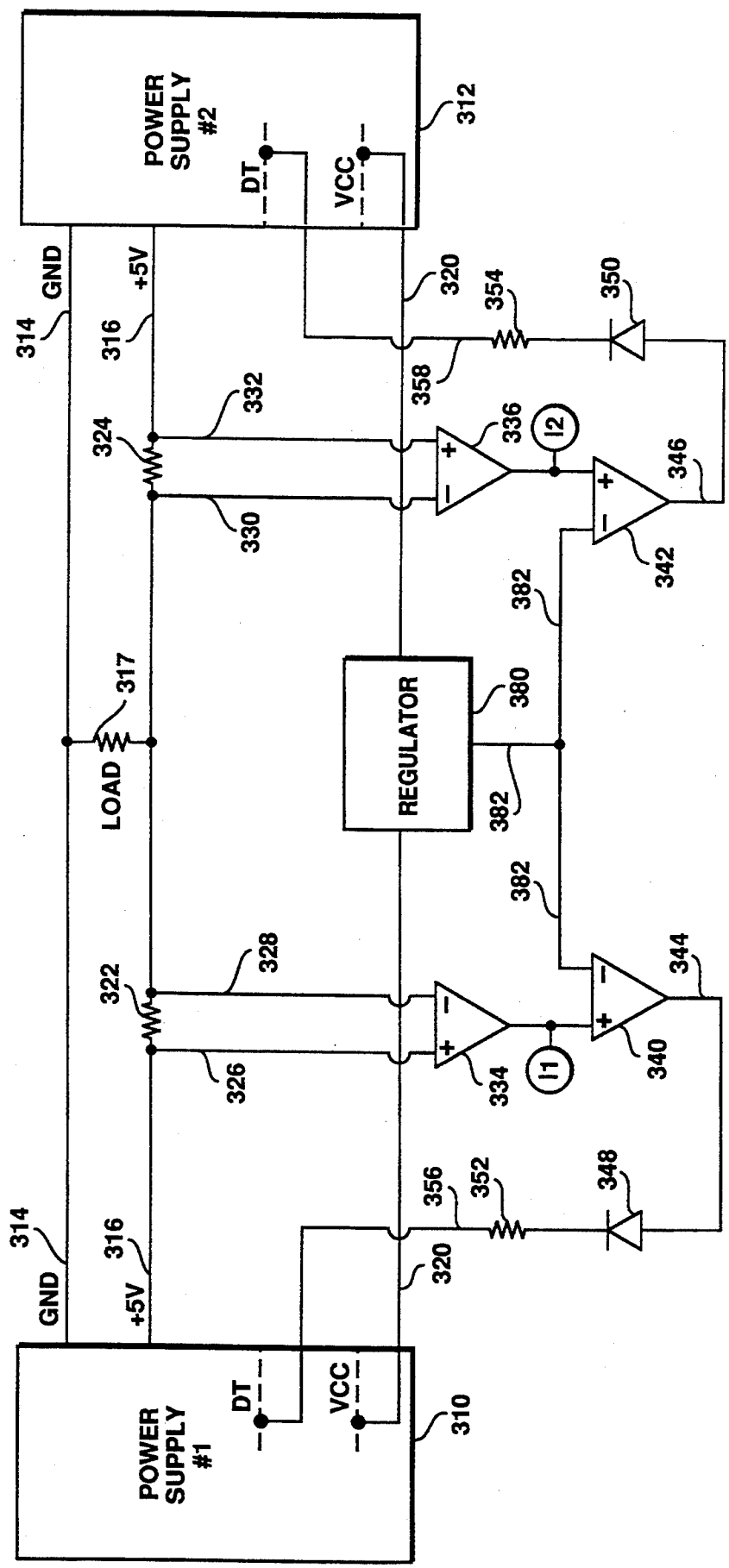
FIG. 3 illustrates the current limiting circuit of the preferred embodiment.

Referring now to FIG. 3, the current limiting circuit of the present invention is illustrated. In a similar configuration to the circuit illustrated in FIG. 2, FIG. 3 illustrates two power supplies, power supply 310 and power supply 312. The Ground line 314 is connected to the ground pin of each power supply. The five volt output 316 of each power supply is coupled through resistors 322 and 324. The system load resistance is illustrated as resistor 317 coupled between Ground line 314 and combined +5 Volt outputs on line 316. The current output of power supply 310 is measured across resistor 322 using lines 326 and 328. These lines are provided as input to amplifier 334. The output of amplifier 334 represents the current I1 being output by power supply 310. In a similar manner, the current output by power supply 312 is measured across resistor 324 using lines 330 and 332. These fines are coupled to amplifier 336. The output of amplifier 336 represents the current I2 being output by power supply 312. The $V_{CC}$ line 320 of each power supply is coupled to regulator 380. Regulator 380 is a well known circuit for regulating the voltage on $V_{CC}$ line 320. The regulated $V_{CC}$ voltage is provided as output on line 382. This regulated $V_{CC}$ voltage is compared with the current output I1 of power supply 310 in amplifier 340. The output of amplifier 340 is coupled through diode 348 and resistor 352 to the internal DEAD TIME (DT) input to power supply 310. The internal DEAD TIME input to power supply 310 is a well known signal that causes power supply 310 to shut down in a fault condition, such as an over-voltage or over-current condition. Using this signal of the conventional power supply 310, the present invention determines when the current output I1 exceeds a predetermined tolerance as determined by the voltage on $V_{CC}$ line 320 and the resistance value of resistor 352. If the current I1 of power supply 310 becomes excessively large, the output 344 of amplifier 340 rises to a high enough voltage level to trigger the DT signal of power supply 310 thereby lowering the output voltage of power supply 310 to limit its current to its maximum output current. In a similar manner, the output current I2 of power supply 312 is compared with the voltage on $V_{CC}$ line 320 in amplifier 342. If the output current I2 of power supply 312 becomes excessively large, the output of amplifier 342 rises to a level high enough to trigger the DT input to power supply 312 thereby lowering the output voltage of power supply 312 to limit its current to its maximum output current. Thus, the current limiting circuit illustrated in FIG. 3 acts to independently shut down a particular power supply if the current output of that power supply rises to an unacceptable level. In an alternative embodiment, the SENSE line of each power supply may be used in place of the DEAD TIME input to force a particular power supply to shut down. This current limiting circuit allows two power supplies to power up together even though they may not come up together. DT will cause one power supply to wait for the other power supply to come up.

Figure 4:
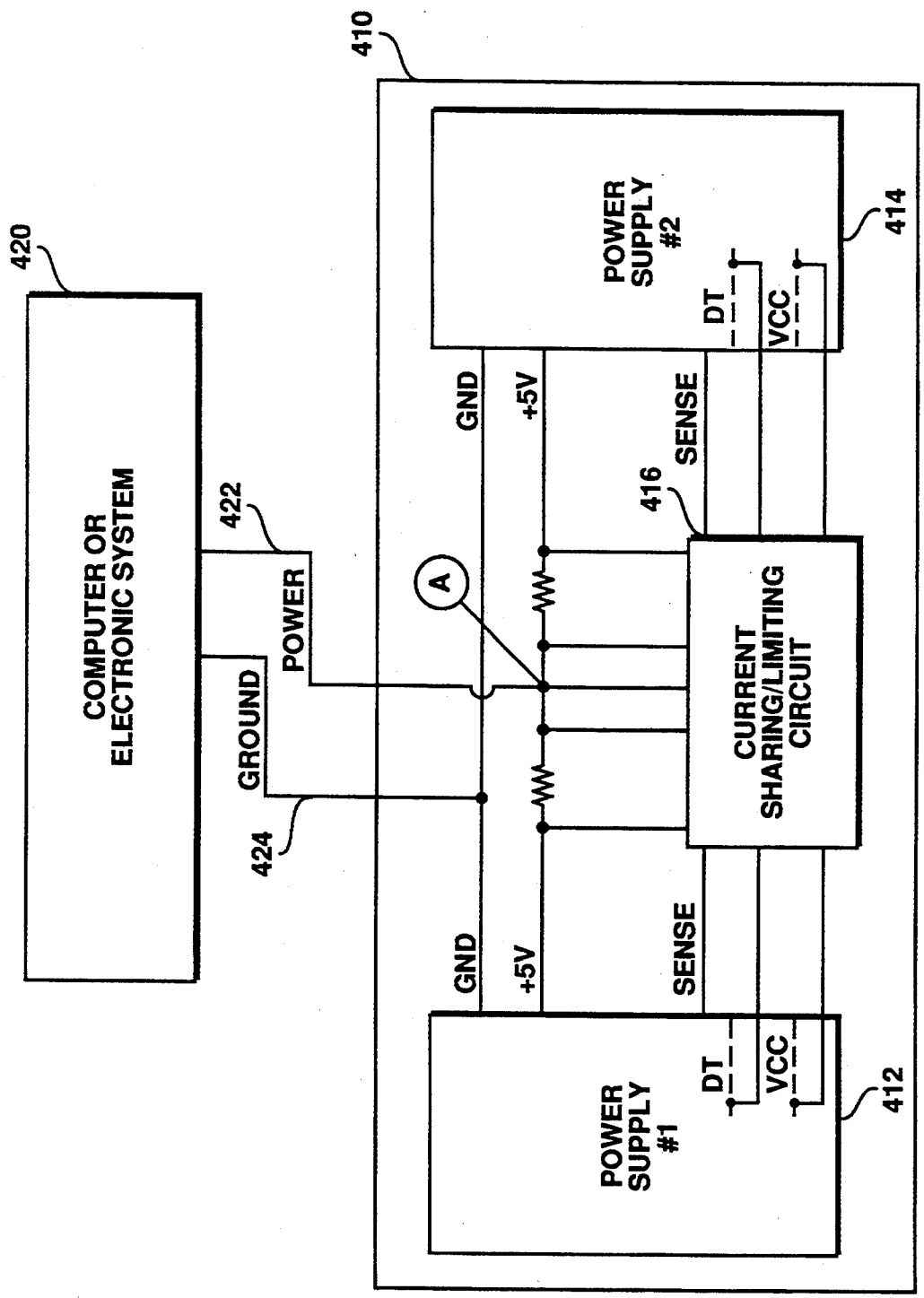
FIG. 4 illustrates the present invention as used in a system.

Referring now to FIG. 4, the current sharing multiple power supply 410 of the present invention is shown in combination with a system 420. System 420 comprises a computer or other electronic system requiring a power connection 422 and a ground connection 424. The combined ground (GND) line within power supply 410 is coupled to ground line 424. The power line 422 is coupled to the combined +5 volt line within power supply 410 at point A. Point A in FIG. 4 corresponds to Point A illustrated in FIG. 2. The coupling of power supply 410 to system 420 in this manner provides the combined power supply output with the current sharing and current limiting capability of the present invention as disclosed herein.

Thus, the circuits illustrated herein allow the use of two low cost power supplies to provide the same power as a higher cost single unit. The current sharing circuit allows a power supply with the higher setpoint voltage to act as a master supply. The output voltage of the combined power supply may be set to a tighter tolerance using an amplifier coupled between the combined five volt output and a reference voltage. This amplifier is further coupled to a reference voltage. The output power may be set to allow the unit to serve as a power supply for outputs with or without the 240 VA safety requirement.

Thus, an apparatus and method for current sharing among multiple power supplies is disclosed. The specific arrangements and methods described herein are merely illustrative of the principles of the invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. Apparatus for current sharing among multiple power supplies each having a sense node and a pair of output nodes respectively coupled to first and second nodes of a load, with each providing an operating potential across the load, the apparatus comprising:

first and second sense resistors;

a third node coupled to the sense node of first and second power supplies through the first and second sense resistors, respectively;

a first current-sensing resistor coupled between the first node of the load and a first output node of the first power supply, the first current-sensing resistor sensing a first current provided by the first power supply to the load;

a second current-sensing resistor coupled between the first node of the load and a first output of the second power supply, the second current-sensing resistor sensing a second current provided by the second power supply to the load;

a feedback amplifier circuit coupled to the first and second current-sensing resistors, the feedback amplifier circuit generating first and second output signals respectively coupled to the sense nodes of the first and second power supplies, a decrease in the first current relative to the second current causes the first output signal to generate a voltage drop across the first sense resistor, thereby causing the operating potential provided by the first power supply to increase until the first and second currents are substantially equal; and means coupled to the first node of the load for setting a tolerance range on the operating potential provided by the multiple power supplies, the means controlling a voltage at the third node in response to variations in the operating potential.

2. The apparatus of claim 1 wherein the means comprises an amplifier having a first input coupled to the first node of the load, a second input coupled to a reference potential, and an output coupled to the third node through a control resistor, the reference potential and control resistor defining the tolerance range.

3. The apparatus of claim 2 wherein the feedback amplifier circuit includes first and second transistors coupled to the first and second sense resistors for generating the first and second output signals, respectively; the first and second transistors selectively increasing the voltage drop across the first and second sense resistors in response to a corresponding increase in the respective first and second currents.

* * * * *

UNITED STATES PATENT AND TRADEMARK OFFICE
CERTIFICATE OF CORRECTION

PATENT NO. : 5,428,524
DATED : June 27, 1995
INVENTOR(S) : Harold L. Massie

It is certified that error appears in the above-indentified patent and that said Letters Patent is hereby corrected as shown below:

In column 5 at line 61 delete "fines" and insert --lines--

In column 7 at line 4 delete "We claim:" and insert --I claim:--

Signed and Sealed this

Tenth Day of December, 1996

Attest:

BRUCE LEHMAN

Attesting Officer

Commissioner of Patents and Trademarks